April 5, 1966  F. D. BARBER ETAL  3,244,462
RESILIENT SIDE BEARINGS FOR RAILROAD CARS
Filed Sept. 20, 1963  2 Sheets-Sheet 2
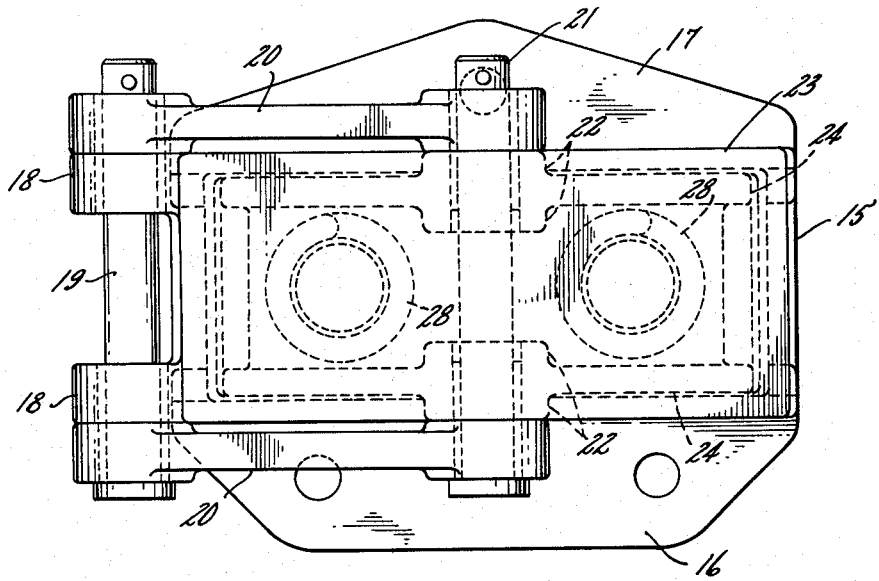
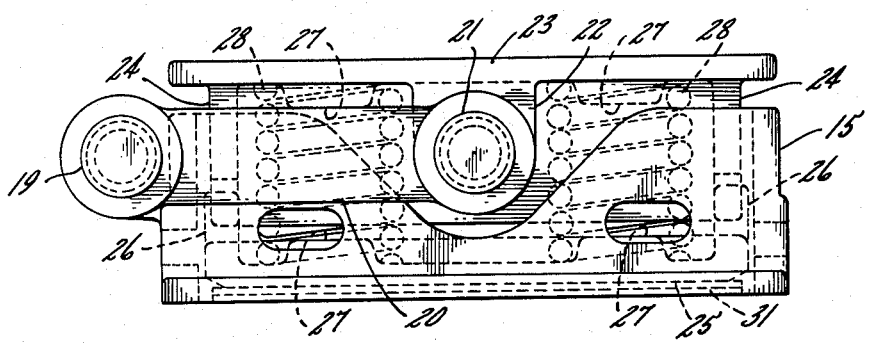
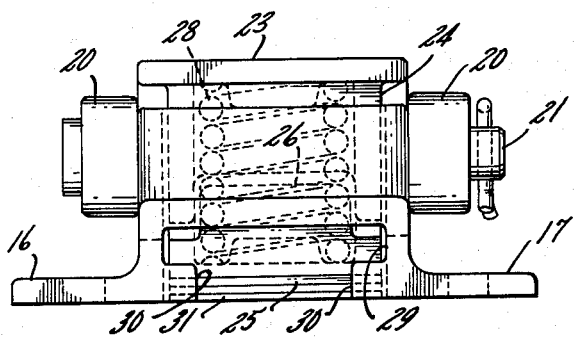
INVENTORS.
FRANKLIN D. BARBER
CLAUS J. WERNER CLASEN
BY
*Parker & Carter*
ATTORNEYS.

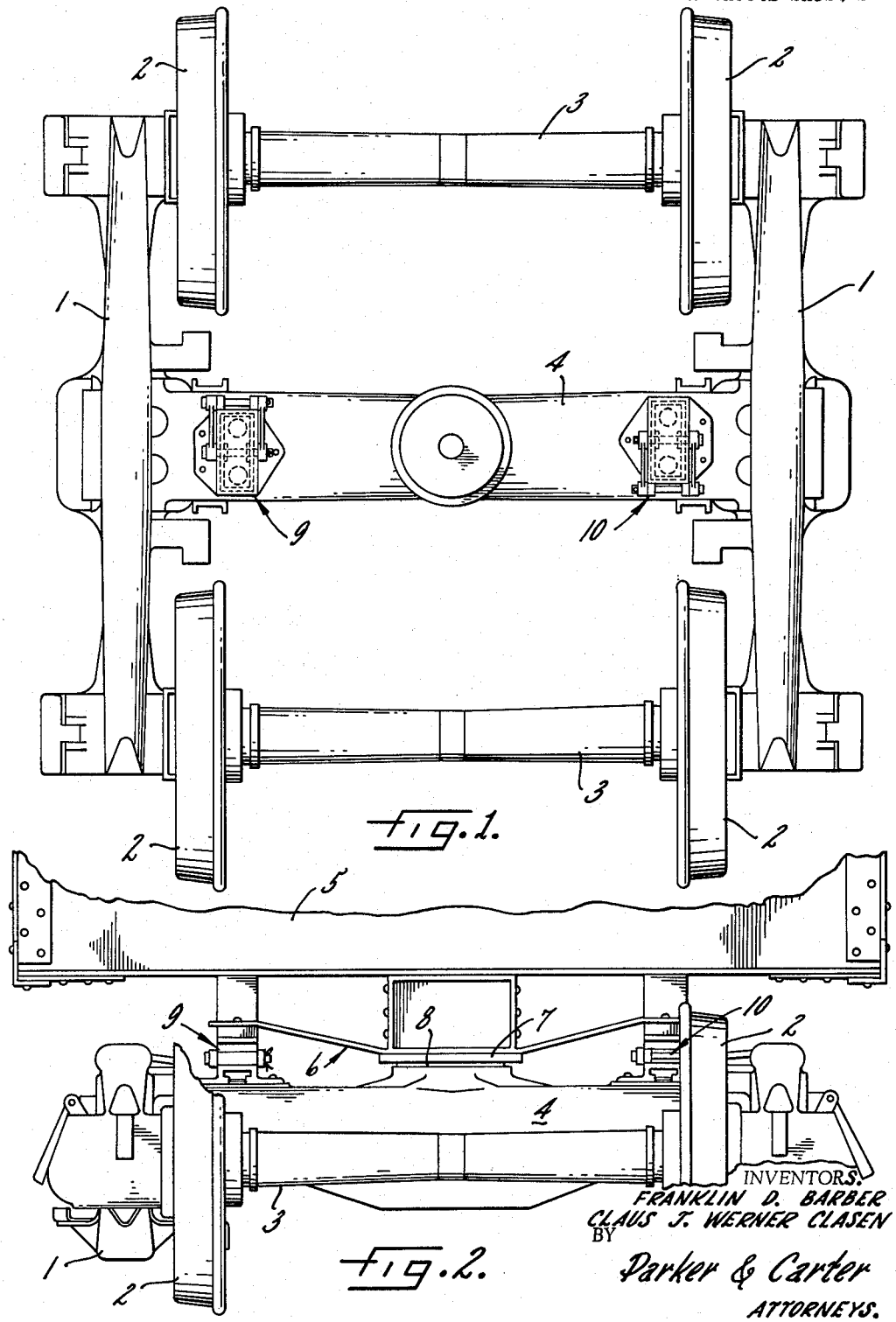
April 5, 1966     F. D. BARBER ETAL     3,244,462
RESILIENT SIDE BEARINGS FOR RAILROAD CARS
Filed Sept. 20, 1963     2 Sheets-Sheet 1
INVENTORS
FRANKLIN D. BARBER
CLAUS J. WERNER CLASEN
BY Parker & Carter
ATTORNEYS.

United States Patent Office 3,244,462
Patented Apr. 5, 1966

3,244,462
RESILIENT SIDE BEARINGS FOR
RAILROAD CARS
Franklin D. Barber and Claus J. Werner Clasen, Chicago,
Ill., assignors to Standard Car Truck Company, Chicago, Ill., a corporation of Illinois
Filed Sept. 20, 1963, Ser. No. 310,204
3 Claims. (Cl. 308—138)

This invention relates to improvements in resilient side bearings for railroad cars and has for one object to provide a smooth, effective, frictional resistance to minimize shimmying or wiggling of a car truck with respect to the car especially at high speeds.

Another object is to provide a resilient side bearing wherein the springs or resilient means are preloaded so that the bearing at both sides of the truck are in constant resilient contact with the car body, thus tending to maintain the car in upright position, resisting and finally arresting rocking of the car with respect to the truck bolster.

Another object is to provide a convenient, easily adjusted, easily inspected resilient side bearing.

Other objects will appear from time to time throughout the specification and claims.

The invention is illustrated more or less diagrammatically in the accompanying drawings, wherein:

FIGURE 1 is a plan view of a railroad car truck showing the location of the side bearings;

FIGURE 2 is a front elevation of the truck of FIGURE 1 showing the car body in position;

FIGURE 3 is a plan view of the side bearing itself;

FIGURE 4 is a side elevation of the bearing shown in FIGURE 3;

FIGURE 5 is an end view of the side bearing of FIGURE 3.

Like parts are indicated by like characters throughout the specification and drawings.

While the invention is illustrated as a separate assembly which can be bolted or riveted to the truck bolster, it is obvious that part of the assembly at least might be cast integral with the bolster.

A railroad car truck including side frames 1, wheels 2, on axles 3, carries the spring supported truck bolster 4. The car body 5 with the car bolster 6 has a car center plate 7 which engages the truck bolster center plate 8 to support the car. Side bearings 9 and 10 extend upwardly from the truck bolster adjacent the opposite ends thereof toward the car body bolster. The car body and truck are of course free to rotate with respect to one another about a vertical axis concentric with the center plates and have a limited relative tilting capacity about a horizontal axis parallel with the longitudinal axis of the car through the center plates.

The side bearings are identical and a description of one suffices for all. Each side bearing includes a vertical walled frame 15, flanged at 16 and 17. The flange 16 has two rivet holes, the flange 17 has one so that the frame may be riveted or bolted to the truck bolster at three points. The frame defines a pocket closed at the bottom by the bolster.

Bearing ears 18 project longitudinally from one end of the frame and carry a pivot pin 19 which extends horizontally transversely of the frame. Side links 20 extend forwardly from the pivot pin 19 on both sides of the frame to carry at their ends a top plate pin 21 which extends through lugs or bearing bosses 22, extending downwardly from the top or friction plate 23. The top plate 23 extends across and telescopes with the frame 15 which is cut away on both sides to provide clearance for the lugs 22 which project from the downwardly extending flanges 24, extending downwardly from the top plate 23. The bottom plate 25 rests upon the truck bolster at the bottom of the frame 15. It has upwardly extending flanges 26 in line with the downwardly depending flanges 24 at both ends and sides of the top plate to furnish a positive stop against downward movement of the top plate. Spring bosses 27 on the bottom and top plates position coil springs 28 in alignment between the upper and lower plates within the upwardly extending rim of the bottom plate.

The frame 15 is apertured as at 29. The aperture is bounded at both sides at the bottom by lugs 30. Adjustment shims 31 underlie the bottom plate and the shims are held against longitudinal displacement by abutting the lugs 30. When it is desired to adjust the bearing, the car will be jacked up, making it possible to raise the bottom plate with the springs and the top plate and insert or remove adjustment shims 31 through the aperture 29 after which the car may be lowered to preload the springs. Since the stop limiting downward movement of the top plate is the upper surface of the rim of the frame 15, such adjustment while changing the height of the top plate to obtain the desired side bearing clearance does not change the maximum permissible travel of the top plate.

The side bearings are positioned at each end of the truck bolster in opposition to bearing plates on the car bolster. These plates are longitudinally arranged with respect to the longitudinal axis of the truck side frame and transversely of the bolster. As the truck tends to rotate with respect to the car about the vertical axis passing through the center plates, the top plate on the side bearing and the bearing plate on the car bolster tend to move generally longitudinally and the side links 20, while permitting up and down movement of the top plate in response to tilting or rocking of the car and the action of the springs, hold the top plate against longitudinal movement. The links 20 either in tension or compression tend to position and center the top plate as it moves up and down in the side frame, thus permitting the springs to work as springs should, up and down along the axis of the coil.

Contact of top plate and bottom plate limits downward movement of the top plate and also prevents bottoming of the springs. The springs are preloaded so that under all conditions of rock of car and truck, there is a frictional pressure applied to the car adjacent both ends of the truck bolster, that frictional pressure tending to assist in preventing shimmying, wobbling or oscillating of the truck while permitting the truck to swing enough to follow the track around a curve. The main frame is open at top and bottom. The adjusting shims rest on the truck and need only to be held in place by the walls of the main frame. It is important that the flanges on the top and bottom plates maintain the same relationship independent of the position of the bottom plate so that the maximum downward movement of the top plate to contact with the bottom plate flanges will always be constant.

We claim:
1. A resilient side bearing for railroad cars and the like,
    (a) including a generally rectangular, vertically walled main frame of greater length than width open at the top and bottom and outwardly flanged at the bottom for attachment to a railroad car,
    (b) apertured bearing ears projecting laterally from an end wall of the main frame in alignment with the side walls,
    (c) the lower portion of such end wall recessed across the main frame below the ears, the lower boundary of the recess being above the bottom of the frame,
    (d) a bottom plate loosely socketed within the main frame,

(a) flanges extending upwardly from the bottom plate in general parallelism with the main frame walls,
(f) springs extending upwardly from the bottom plate, a top friction plate resting on the springs,
(g) flanges depending downwardly therefrom in register with the flanges on the bottom plate,
(h) the flanges on the top plate being thickened intermediate the ends of the plate to define bearing bosses,
(i) the side walls of the main frame being cut away to provide clearance for said bosses,
(j) pivot pins extending through the ears on the main frame and the bosses on the top frame,
(k) tension links outside the main frame pivoted on said pins to inhibit lateral movement of the top with respect to the bottom plates.

2. The device of claim 1 characterized by the removable shims loosely enclosed with the main frame of such size as to be easily inserted through and removed through the recess in the end wall and of such thickness as to support the bottom plate with the bottom thereof below the lower edge of the recess.

3. The device of claim 2 characterized by the clearance between the flanges on top and bottom plates being less than the clearance between the top plate and the walls of the housing.

References Cited by the Examiner

UNITED STATES PATENTS

| | | | |
|---|---|---|---|
| 347,647 | 8/1886 | Schoen | 267—20 |
| 533,009 | 1/1895 | Holland et al. | |
| 637,536 | 11/1899 | Thompson | 308—224 |
| 1,179,755 | 4/1916 | Price et al. | 308—224 |
| 1,237,166 | 8/1917 | Burrmann | 105—200 |
| 1,237,167 | 8/1917 | Burrmann | 105—200 |
| 1,438,837 | 12/1922 | Leboucher | 105—453 |
| 1,717,045 | 6/1929 | Larsen | 308—138 |
| 2,747,862 | 5/1956 | Gouirand | 267—66 X |
| 2,804,356 | 8/1957 | Jiroch | 105—199 |

ARTHUR L. LA POINT, *Primary Examiner.*